(No Model.)

2 Sheets—Sheet 2.

W. L. CHURCH.
APPARATUS FOR MAKING ICE.

No. 529,345.

Patented Nov. 13, 1894.

Witnesses.
A. C. Harmon
A. D. Harrison

Inventor.
Wm Lee Church
by Wright Brown Crosby
Attys.

THE NORRIS PETERS CO., PHOTO-LITHO., WASHINGTON, D. C.

United States Patent Office.

WILLIAM LEE CHURCH, OF NEWTON, MASSACHUSETTS, ASSIGNOR TO THE WESTINGHOUSE, CHURCH, KERR & COMPANY, OF JERSEY CITY, NEW JERSEY AND NEW YORK, N. Y.

APPARATUS FOR MAKING ICE.

SPECIFICATION forming part of Letters Patent No. 529,345, dated November 13, 1894.

Application filed January 23, 1894. Serial No. 497,765. (No model.)

*To all whom it may concern:*

Be it known that I, WILLIAM LEE CHURCH, of Newton, in the county of Middlesex and State of Massachusetts, have invented certain new and useful Improvements in Methods of and Apparatus for Making Ice, of which the following is a specification.

This invention relates to the manufacture of ice in a pan or receptacle, the sides and bottom of which confine a body of water and impart their own form to the cake of ice resulting from the freezing of the water.

Heretofore in many plants for the manufacture of ice in pans or receptacles, the sides as well as the bottom of the can have been acted on by the freezing agent, so that the freezing action has progressed from the sides as well as from the bottom of the can, the result being the formation of a cake which during the freezing operation is not level or flat on its upper surface, but is considerably higher at the sides than at the central portion of the pan.

My invention has for its chief object to maintain the top surface of the cake of ice artificially frozen in a pan substantially flat or horizontal during the entire operation, so that said surface may be kept covered by a part of the charge of sweet water supplied to the pan, for the following purposes, viz: first, to enable the covering water to be continuously moved over the upper surface of the cake during the freezing operation and thus remove the air bubbles accumulating thereon and prevent the entrapping of said bubbles in the ice; secondly, to prevent the top surface of the cake from being formed in contact with the atmosphere, such contact causing the formation of minute cells or fractures in the upper portion of the cake, resulting in a whitish discoloration of the surface of the cake; and, thirdly, to aid in detaching the cake from the pan by floating or raising it from the bottom of the pan.

To these ends the invention consists in the improvements which I will now proceed to describe and claim.

Figure 1:
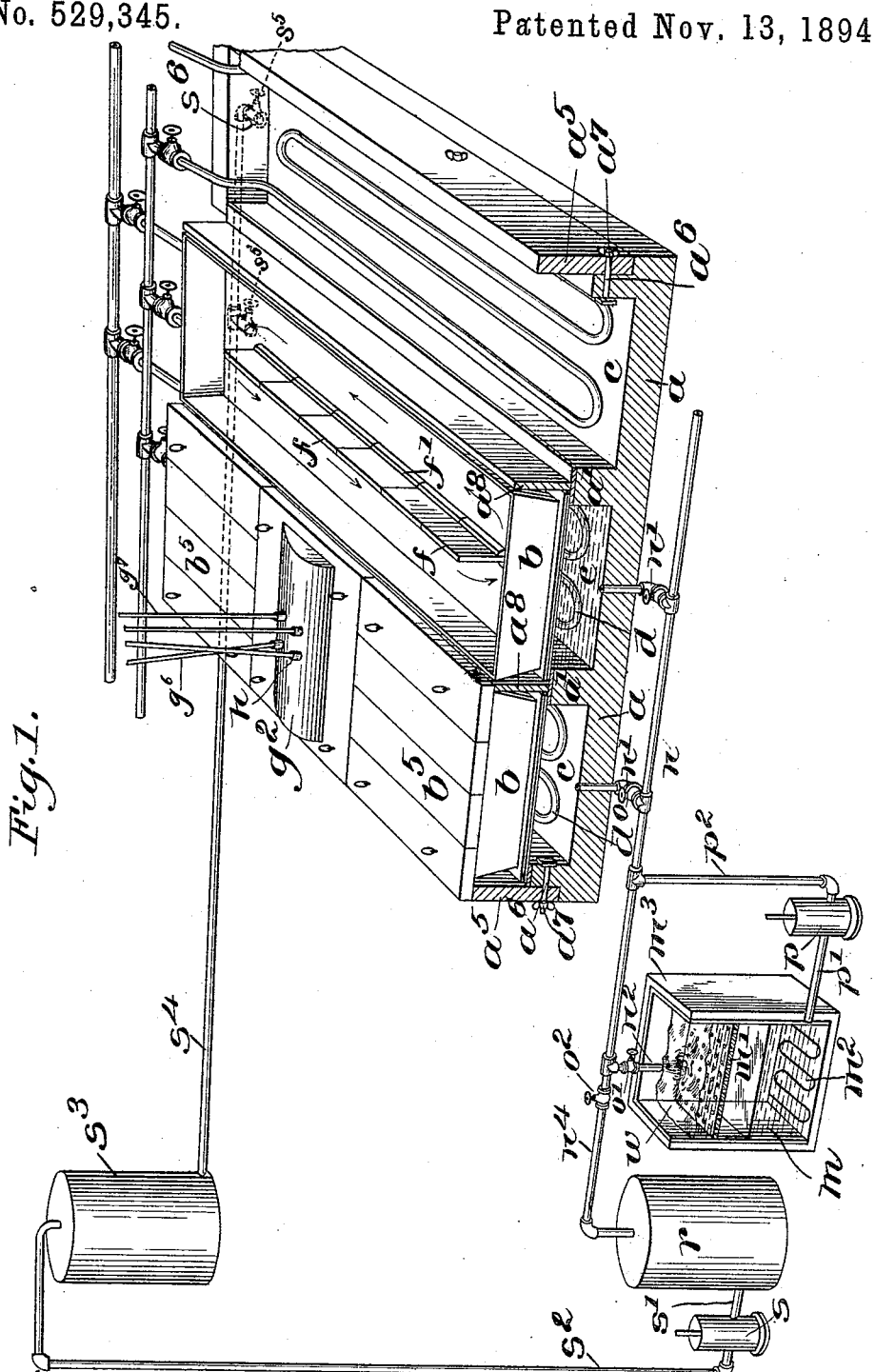
Figure 2:
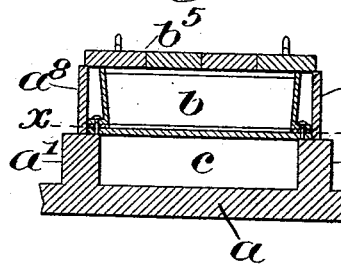
Figure 3:
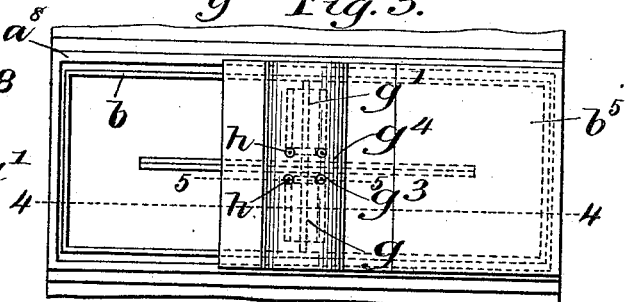
Figure 4:
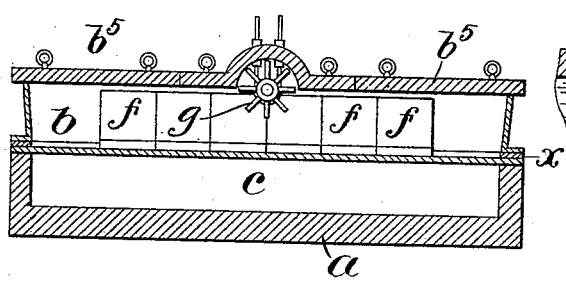
Figure 5:
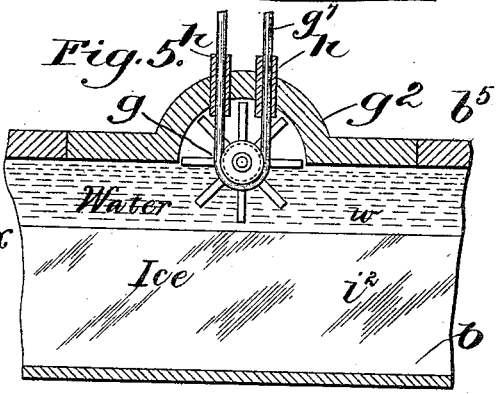
Figure 6:
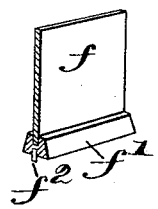
Figure 7:
Figure 8:

Of the accompanying drawings forming a part of this specification,—Figure 1 represents a perspective view, showing an organized apparatus or machine for freezing ice in accordance with my invention, a portion of the apparatus being shown in section. Fig. 2 represents a transverse section of a portion of said apparatus. Fig. 3 represents a top plan view of a portion of said apparatus. Fig. 4 represents a section on line 4—4 of Fig. 3. Fig. 5 represents an enlarged section on line 5—5 of Fig. 3. Fig. 6 represents a perspective view of one of the sections of the removable partition which is placed in the pan. Fig. 7 represents a transverse section through one of the pans, showing the cake of ice in the position in which it was formed and covered by a body of water. Fig. 8 represents a similar view, showing the cake elevated from the bottom of the pan by the water.

The same letters of reference indicate the same parts in all the figures.

In the drawings: $a$ represents a shallow tank, which is perfectly subdivided into a series of compartments, as clearly shown in Figs. 1 and 2, said tank being adapted to contain a body of liquid, such as brine, used as a conducting medium between a conduit containing a refrigerating agent and the exposed under surface of a water pan or receptacle.

$b$ represents a pan which is adapted to be supported by the tank $a$, and is so formed that when in place in the tank its bottom will be separated from the bottom of the tank by a space $c$ adapted to contain the liquid above-mentioned. In the space $c$ is a suitable conduit $d$ for a refrigerating agent, such as anhydrous ammonia, which may be circulated through said conduit by any well-known or suitable means, the conduit $d$ being here shown as a pipe, extending in one or more bends along the bottom of the tank, and connected at its ends with receptacles for liquid and gas, the refrigerant circulated through said pipes acting in a manner well understood in ice-making to absorb heat from the liquid in the space $c$ and through the latter from the water in the pan $b$.

The side walls of the tank are separated from the bottom thereof by an interposed layer $x$ of material, which is practically a nonconductor of heat, such, for example, as india rubber. Said layer, while maintaining a water-tight connection between the bottom and sides of the pan, prevents the absorption of heat by the refrigerating agent through the bottom of the pan. Hence there is no tendency of the edges of the cake of ice to creep upwardly on the sides of the pan, and form a cake which is higher at the edges than elsewhere, the top of the cake being kept substantially flat or horizontal. The sides of the pan are separated from the space $c$ under the pan by said insulating layer and by the walls $a'$ on which the pans rest as shown in Figs. 1 and 2, so that the refrigerant cannot act on the external surfaces of the side walls of the can. When a series of pans are assembled, their adjacent sides are separated by air spaces which are covered by the pan covers $b^5$, said covers projecting over said spaces.

The pan $b$ is adapted to contain a body of water of suitable dimensions for a cake of ice; and when the water is in place, the refrigerating agent acts only on the bottom of the pan, so that the formation of ice begins at the bottom and progresses upwardly, the result being a cake which is of uniform solidity, and free from air.

The pans shown are elongated, each being adapted to contain a cake of ice considerably longer and wider than the standard size, the cake requiring to be subdivided into smaller cubes.

An important feature of my invention consists in arresting the freezing operation before the entire cake has been frozen, leaving a body of water $w$ above the ice $i^2$ as shown in Fig. 7. This I accomplish by shutting off the refrigerant after the freezing has progressed to the desired height. By this method, I accomplish the following desirable results: first, I prevent the imprisonment of air bubbles and the formation of cells or fractures in the upper portion of the cake, which result would take place if the entire body of water were frozen to the surface; secondly, I utilize the body of water on top of the ice in detaching the cake from the bottom of the pan, the water finding its way by gravitation into any crevices that may be formed at the sides of the pan, and having a strong tendency to float or raise the cake of ice, so that it is not necessary to spend as much time in warming the surfaces of the pan and thus loosening the cake therefrom as would be required without the presence of the body of water; and, thirdly, I am enabled to cause the water to continuously brush the top surface of the ice during the entire freezing operation, by circulating the water as hereinafter described, so that the bubbles of air accumulating on said surface are swept away and prevented from being entrapped in the ice, this brushing action being made feasible by the maintenance of the flat top surface on the cake as above described, so that all parts of said surface are continuously submerged and uniformly brushed by the circulation of the water.

Fig. 8 shows the relative positions of the cake and water after the detachment of the cake from the surfaces of the pan.

I prefer to place eye-bolts $e\ e$ in the water, before the freezing operation, said bolts being frozen into the cake, and having eyes at their upper ends, which may be engaged with grappling-hooks for the purpose of raising the cake.

In maintaining a continuous movement of the water during the freezing operation, in order that the top of the accumulation of ice may be continuously swept or brushed to remove air-bubbles expelled from the ice by the upwardly-freezing action, I subdivide the interior of the pan so as to form a continuous water-course or way, including the entire charge of water, and of such form that when an impulse is given to the water at any point in said way, said impulse will be continued through the entire mass of water, so that all the water will be kept in continuous motion. I prefer to subdivide the pan and form the said water-course or way by inserting in the pan a removable partition, composed preferably of a series of sections $f\ f$, placed end to end on the bottom of the pan and extending vertically therefrom, said sections collectively forming a partition which extends longitudinally through the pan, and is separated from the sides and ends thereof by spaces of about equal width, so that water set in motion at any point in the pan will be caused to move around the pan in the course indicated by the arrows in Fig. 1, with equal velocity at all points.

The sections $f$ are preferably thin strips or pieces of sheet metal or other suitably durable material, each having a base or foot $f'$, and downwardly projecting dowels, $f^2$, the latter entering sockets formed for their reception in the bottom of the pan. I do not limit myself, however, to this construction, and may secure the sections in any other suitable way, or rely wholly upon gravitation to hold them in place, it being in all cases desirable that the sections be readily removable from the pan, so that when incorporated in the cake of ice they will be removed therewith from the pan.

The sections $f$ are preferably so proportioned that the joints or crevices between their ends will coincide with the proposed lines of transverse division of the cake into smaller cakes. The width of the pan is preferably such that the ice formed at each side of the partition is of sufficient width for a commercial cake of ice. It will be seen, therefore, that when a cake of ice has been formed in the pan and removed therefrom, the sections of the partition do not at all interfere with the subdivision of the cake into cakes of commercial size, but rather facilitate said operation, particularly the longitudinal division, the partitions being usually removed before such division, and leaving narrow slots in the ice forming parts of the sides of the completed cakes.

$g$ $g'$ represent water-impelling devices, which are arranged to act upon the charge of water in the pan near the surface thereof, said devices being preferably wheels, having radiating buckets formed like an ordinary breast-wheel, the shafts of said wheels being journaled in bearings in the top-piece or cover, $g^2$, which is adapted to rest upon the edges of the pan, and is removable therefrom, the two wheels being at opposite sides of the partition. Means are provided for rotating said wheels simultaneously in opposite directions, such means being, for example, belts $g^6$ $g^7$ running upon pulleys $g^3$ $g^4$ affixed to the shafts of said wheels, from a suitable driving or counter-shaft, one of said belts being crossed and the other open. It will be seen that the rotation of said wheels causes and maintains a progressive movement of the water through the course or way above described, so that the surface of the accumulation of ice is continuously brushed or swept during the freezing operation. I prefer to locate the wheels $g$ $g'$ at such height that their lowest blades will be above the top of the cake when the latter has been frozen to the desired thickness, so that the cake will not be hollowed or depressed under said wheels. This is made possible by the fact that I use a charge of water deeper than the proposed thickness of the cake, and arrest the freezing operation before the entire charge is frozen, a layer of water being left upon the top of the cake as already described. The wheels $g$ $g'$ are therefore arranged to enter the water only to such depth as will permit the formation of a cake of the desired thickness entirely below the lowest portions of the wheels.

It is obvious that a continuous movement of the water may be maintained by the use of one wheel or water-circulating device located at one side of the partition, instead of two as here shown. Hence I do not limit myself in this particular. Neither do I limit myself to the employment of the wheels $g$ $g'$ as the means for maintaining a movement of water, as any other suitable means may be used in connection with the partition forming a water-way which includes the entire mass of water in the pan. Nor do I limit myself to a partition necessarily in sections, since it is obvious that a continuous partition in one piece would be equally effective in producing a continuous circulating water-way, the object of dividing the partition into sections being wholly to facilitate the separating of the large cake of ice into a corresponding number of sections for its more convenient removal from the pan. The formation of said water-way is an important feature of my invention, since, if the water-impelling devices were used without such water-way, the movement of the water would not be uniformly effective over the whole pan, but would be primarily confined to a relatively limited area, and would not include the entire charge of water, except as it might be affected by eddies, unless a comparatively large number of water-impelling devices were employed, involving considerable complication and expense.

The wheels $g$ $g'$ are preferably covered by hoods or casings $g^2$, formed on the top or cover of the pan to prevent scattering of the water and to maintain the insulation of the pan against the entrance of warmer air from outside. The driving-belts may pass through tubular bushings $h$ in said hoods, said bushings being preferably elastic rubber tubes formed to prevent the escape of water around the belts, and to maintain the insulation as aforesaid.

In Fig. 1, I show an organized apparatus, which includes means for emptying and charging the spaces $c$ of the tanks, and for admitting warm brine to said spaces for the purpose of detaching the cakes of ice.

$m$ represents what I term a brine-holder, to receive brine removed from the spaces $c$. Said brine-holder is here shown in the form of a tank, open at its top and provided with a perforated horizontal partition $m'$, upon which a body of salt may be placed, to strengthen the brine poured into the holder, said brine percolating through the salt and through the perforated partition into the lower portion of the holder, where it may be cooled in any suitable way, such as by a coil $m^2$ of pipe, in which ammonia may be expanded to reduce the temperature of the brine. I do not limit myself, however, to providing means for cooling the brine, since, for reasons hereinafter shown, it is preferable to have the brine slightly raised in temperature when it is returned into the compartments in the freezing tank.

The holder $m$ is sheathed, to prevent the absorption of heat from the air, by an insulating covering $m^3$ of wood or other suitable material, so that the brine may be kept for a considerable time in the holder $m$ after its removal from the space $c$, without becoming materially warmer, one object of the holder $m$ being to temporarily receive the brine from under one or more of the pans $b$ while said pan is being acted on by a relatively warmer brine introduced for the purpose of detaching the cake of ice.

$n$ represents a pipe, connected by branches $n'$ $n'$ with the spaces $c$, said pipe having a branch or nozzle $n^2$ adapted to discharge into the brine-holder $m$. The branches $n'$ and $n^2$ are provided respectively with stop-cocks $o$ and $o'$, whereby they may be closed. The holder $m$ is arranged so that liquid may flow from the spaces $c$ through the branches $n'$, pipe $n$, and branch or nozzle $n^2$, by gravitation, into the holder $m$, through the body of salt, whereby full saturation is constantly maintained.

$p$ represents a pump, which is connected by a pipe $p'$ with the holder $m$, and by a pipe $p^2$ with the pipe $n$. Said pump is adapted to force brine upwardly from the holder $m$ into the spaces $c$. When it is desired to transfer brine from one or more of the spaces $c$ to the holder $m$, the cocks $o$ and $o'$ are opened, and the brine is allowed to flow by gravitation into the holder $m$. When it is desired to charge the spaces $c$ from the holder $m$, the pump $p$ is put in operation, the cock $o'$ is closed, and the brine is forced upwardly into the said spaces.

To permit the convenient introduction of relatively warm brine into the spaces $c$, for the detachment of the cakes of ice, I provide the following means: $r$ represents a tank, which may receive relatively warm brine from the pipe $n$, said tank being connected with the pipe $n$ by an extension $n^4$ thereof, which may be shut off from the pipe $n$ by a cock $o^2$. Hence the relatively warm brine may be shut off from the holder $m$, and allowed to flow by gravitation into the tank $r$. $s$ represents a pump, connected by a pipe $s'$ with the tank $r$, and by a pipe $s^2$ with an elevated tank $s^3$, which in turn is connected with the spaces $c$ by means of a pipe $s^4$ and branches $s^5$ thereof, each of said branches having a stop-cock $s^6$. The tanks $r$ and $s^3$ are not insulated, so that brine accumulated in them will absorb heat from the air and will therefore be at about the temperature of the surrounding air after standing a short time. The relatively warm brine accumulated in the tank $r$ may be raised by the action of the pump to the tank $s^3$, and may be admitted to either of the spaces $c$ when desired, the tank $s^3$ being elevated, so that brine will flow therefrom to said spaces by gravitation.

The operation of the apparatus is or may be as follows: Prior to freezing the water in the pan $b$, the space $c$ under said pan is charged with brine from the holder $m$ by the pump $p$, the brine being in contact with the bottom but not with the sides of the pan. The refrigerating agent is then circulated through the brine, the sweet water in the pan is set in motion, and the freezing action takes place vertically, as already described. When the cake has been frozen to the desired thickness, the refrigerating agent is shut off, and the cold brine temporarily withdrawn to the holder $m$. Relatively warm brine from the tank $s^3$ is admitted to the space $c$, and co-operates with the water at the top of the cake of ice in the pan in loosening the cake, the water acting by its buoyancy to raise the cake from the bottom of the pan. After this, the relatively warm brine is withdrawn and transferred by way of pipes, $n$ $n^4$ to the tank $r$, and the colder brine from the holder $m$ is returned by the pump $p$ to the space $c$. The operation is thus continued, the charges of brine used in freezing being brought in contact with the bottom of the pans, alternating with the charges used in detaching. I prefer to graduate the temperature at the bottom of the pans $b$, beginning the freezing action at a somewhat higher temperature than that subsequently employed, so that the initial formation of the ice will be somewhat retarded, the object being to enable air bubbles to escape from the ice. It is a fact that when the temperature which is desirable after the cake has been partially formed is applied at the start, the initial freezing will be so rapid that the air bubbles will not have time to escape, and will be entrapped at the bottom portion of the cake. The temperature may be graduated either by beginning the freezing operation without the presence of brine in the spaces $c$, using air as the conducting medium until the freezing operation has sufficiently progressed, and then admitting the brine; or by partially filling said space with brine, without allowing it to reach the bottom of the pan; or by utilizing the slight relative warmth of the brine from the holder $m$ at the beginning of the operation.

It will be seen that by freezing water upwardly in a shallow pan, without freezing horizontally, thus maintaining a horizontal top surface on the cake, and continuously brushing said surface as described, the air contained in the water is naturally expelled before the upwardly-advancing ice, and removed as fast as expelled. The presence of air in the water is not therefore objectionable, so that there is no necessity of distilling and reboiling the water to free the same from air, simple filtration being a sufficient preparation of the water. Much of the expense heretofore incurred in the use of steam in preparing the water for freezing is therefore saved by my invention.

In both forms of apparatus shown in the drawings, I provide the pans with stout wooden covers $b^5$, closely fitting the upper edges of the pans, and provided preferably with means, such as eyes or rings, $b^6$, whereby they may be conveniently raised.

In Fig. 1, I show the tank $a$ provided with detachable side pieces $a^5$ extending above and detachably secured to the outer walls $a'$, said side pieces covering the outer sides of the outer pans, and co-operating with the covers $b^5$ in excluding air from the said sides. When it is desired to expose the sides of the tanks to the action of the air for the purpose of detaching the cakes from said sides, the pieces $a^5$ may be removed, any suitable fastening devices, such as bolts $a^6$ and nuts $a^7$, being employed to detachably secure said pieces. Similar detachable pieces are provided to cover the ends of the pans. Partitions $a^8$ may be affixed to the top surfaces of the walls $a'$ between those at the sides of the tank, said partitions extending to the top edges of the pans and co-operating with the covers in inclosing the sides of the pans, so that when freezing in one pan is arrested and the ice is being liberated and removed, the freezing may continue in the next pan, exposure of its sides being prevented by the partitions $a^8$ and covers $b^5$.

Brine artificially cooled outside the tank may be introduced into the tank instead of being cooled within the tank by the circulation of a refrigerating agent through the pipes $d$, and in such case said pipe may be omitted and a pump employed to force the cold brine into the tank.

I claim—

1. An ice machine, comprising in its construction a substantially horizontal water-supporting bed, water confining sides or walls having a water tight connection with said bed but insulated therefrom against the conduction of heat, and means for applying a freezing agent to the bottom only of said bed and thereby freezing from the bottom upwardly, the insulation preventing the ice from forming more rapidly along the side walls than elsewhere, and thereby keeping the top surface of the cake substantially parallel with the bed.

2. In an ice machine, the combination of a tank, a water-supporting bed separated from the bottom of the tank by a space, water confining walls above said bed separated from said space and insulated from the bed, and means for introducing a refrigerating agent into said space, as set forth.

3. In an ice machine, the combination of a brine tank, an insulated brine holder having a perforated partition supporting a mass of salt, and means for transferring brine from the tank to the holder and back from the holder to the tank.

4. An ice forming pan provided with a partition partially subdividing it along its longitudinal center and forming a continuous water way or course, and with a water impelling device adapted to cause a movement of the water along said course during the freezing operation.

5. An ice forming pan having a removable partition forming a continuous water way or course, and a water impelling device adapted to cause a movement of the water along said course, the partition being removable from the pan with the cake of ice.

6. An ice forming pan having a removable partition composed of independent sections collectively forming a continuous waterway or course, and a water impelling device adapted to cause a movement of the water along said course, the sections of the partition permitting the subdivision of the cake of ice into smaller cakes containing the sections.

7. The combination of an ice-forming pan, a removable top piece or cover thereon, and a water-impelling wheel journaled in bearings in said cover.

8. The combination of an ice-forming pan, a removable top piece or cover thereon, two independent water-impelling wheels journaled in bearings in said cover, and means for rotating said wheels simultaneously in opposite directions.

9. The combination of an ice-forming pan, a removable top-piece or cover, a rotary water-impelling device journaled in said cover and provided with a pulley, a driving belt engaged with said pulley and passing through orifices in said cover, and flexible packing bushings surrounding said orifices and adapted to exclude air from the pan and to prevent scattering of water.

10. In an ice machine the combination of a tank having walls or supports such as $a'$, ice-forming pans resting on said walls, removable side pieces adapted to cover the outer sides of the pans, and covers co-operating with the side pieces in excluding outside air from the said sides, the removability of the side pieces enabling the sides of the tanks to be exposed as set forth.

In testimony whereof I have signed my name to this specification, in the presence of two subscribing witnesses, this 13th day of January, A. D. 1894.

WM. LEE CHURCH.

Witnesses:
HENRY J. CONANT,
WILLIAM R. RONEY.